(12) United States Patent
Yang et al.

(10) Patent No.: US 10,341,118 B2
(45) Date of Patent: Jul. 2, 2019

(54) SSL GATEWAY WITH INTEGRATED HARDWARE SECURITY MODULE

(71) Applicant: A10 Networks, Inc., San Jose, CA (US)

(72) Inventors: Yang Yang, San Jose, CA (US); Xuyang Jiang, Saratoga, CA (US); Ali Golshan, Palo Alto, CA (US)

(73) Assignee: A10 Networks, Inc., San Jose, CA (US)

( * ) Notice: Subject to any disclaimer, the term of this patent is extended or adjusted under 35 U.S.C. 154(b) by 270 days.

(21) Appl. No.: 15/225,818

(22) Filed: Aug. 1, 2016

(65) Prior Publication Data

US 2018/0034643 A1 Feb. 1, 2018

(51) Int. Cl.
*H04L 29/08* (2006.01)
*H04L 9/32* (2006.01)
(Continued)

(52) U.S. Cl.
CPC .......... *H04L 9/3263* (2013.01); *H04L 9/0827* (2013.01); *H04L 9/0894* (2013.01); *H04L 63/00* (2013.01); *H04L 63/0281* (2013.01); *H04L 63/0823* (2013.01); *H04L 63/166* (2013.01); *H04L 67/141* (2013.01); *H04L 2209/76* (2013.01)

(58) Field of Classification Search
CPC ... H04L 9/3263; H04L 9/0894; H04L 9/0827; H04L 63/166; H04L 63/0823; H04L 63/0281; H04L 67/14; H04L 2209/76
See application file for complete search history.

(56) References Cited

U.S. PATENT DOCUMENTS 4,001,819 A 1/1977 Wise
5,101,402 A 3/1992 Chiu et al.
(Continued)

FOREIGN PATENT DOCUMENTS

CN 1422468 A 6/2003
CN 104106241 A 10/2014
(Continued)

OTHER PUBLICATIONS

Freier, A., Karlton, P., and P. Kocher, "The Secure Sockets Layer (SSL) Protocol Version 3.0", RFC 6101, DOI 10.17487/RFC6101, Aug. 2011.*

(Continued)

*Primary Examiner* — Matthew T Henning
(74) *Attorney, Agent, or Firm* — Keith Kline; The Kline Law Firm PC

(57) ABSTRACT

A security network system may include a security gateway operable to establish a client session between the security gateway and a client device. The security gateway is operable to receive client session information from the client session. The client session information includes an identification of a server with which the client device needs to exchange data. The security network system may also include a Hardware Security Module (HSM) in communication with the security gateway. The HSM is operable to establish, in concert with the security gateway, a secure session between the security gateway and the server based on the client session data, a public key, a secret key, and context attributed to the secure session.

20 Claims, 10 Drawing Sheets

(51) Int. Cl.
*H04L 9/08* (2006.01)
*H04L 29/06* (2006.01)

(56) References Cited

U.S. PATENT DOCUMENTS

| | | | |
|---|---|---|---|
| 5,163,088 A | 11/1992 | LoCascio | |
| 5,359,659 A | 10/1994 | Rosenthal | |
| 5,414,833 A | 5/1995 | Hershey et al. | |
| 5,684,875 A | 11/1997 | Ellenberger | |
| 5,940,002 A | 8/1999 | Finn et al. | |
| 5,960,177 A | 9/1999 | Tanno | |
| 6,088,804 A | 7/2000 | Hill et al. | |
| 6,119,236 A | 9/2000 | Shipley | |
| 6,205,115 B1 | 3/2001 | Ikebe et al. | |
| 6,237,036 B1 | 5/2001 | Ueno et al. | |
| 6,304,975 B1 | 10/2001 | Shipley | |
| 6,324,286 B1 | 11/2001 | Lai et al. | |
| 6,449,651 B1 | 9/2002 | Dorfman et al. | |
| 6,519,703 B1 | 2/2003 | Joyce | |
| 6,594,780 B1 | 7/2003 | Shen et al. | |
| 6,715,081 B1 | 3/2004 | Attwood et al. | |
| 6,732,279 B2 | 5/2004 | Hoffman | |
| 6,735,702 B1 | 5/2004 | Yavatkar et al. | |
| 6,754,832 B1 | 6/2004 | Godwin et al. | |
| 6,757,822 B1 | 6/2004 | Feiertag et al. | |
| 6,779,117 B1 | 8/2004 | Wells | |
| 6,988,106 B2 | 1/2006 | Enderwick et al. | |
| 7,159,237 B2 | 1/2007 | Schneier et al. | |
| 7,194,766 B2 | 3/2007 | Noehring et al. | |
| 7,222,366 B2 | 5/2007 | Bruton, III et al. | |
| 7,296,283 B2 | 11/2007 | Hrastar et al. | |
| 7,392,241 B2 | 6/2008 | Lin et al. | |
| 7,418,733 B2 | 8/2008 | Connary et al. | |
| 7,543,052 B1 | 6/2009 | Cesa Klein | |
| 7,565,549 B2 | 7/2009 | Satterlee et al. | |
| 7,577,833 B2 | 8/2009 | Lai | |
| 7,640,591 B1 | 12/2009 | Tripathi et al. | |
| 7,653,633 B2 | 1/2010 | Villella et al. | |
| 7,665,138 B2 | 2/2010 | Song et al. | |
| 7,739,736 B1 | 6/2010 | Tripathi et al. | |
| 7,809,131 B1 | 10/2010 | Njemanze et al. | |
| 7,895,649 B1 | 2/2011 | Brook et al. | |
| 8,037,532 B2 | 10/2011 | Haswell | |
| 8,220,056 B2 | 7/2012 | Owens, Jr. | |
| 8,239,670 B1 | 8/2012 | Kaufman et al. | |
| 8,289,981 B1 | 10/2012 | Wei et al. | |
| 8,301,802 B2 | 10/2012 | Wei et al. | |
| 8,448,245 B2 | 5/2013 | Banerjee et al. | |
| 8,478,708 B1 | 7/2013 | Larcom | |
| 8,595,845 B2 | 11/2013 | Basavapatna et al. | |
| 8,800,034 B2 | 8/2014 | McHugh et al. | |
| 8,806,011 B1 | 8/2014 | Graham-Cumming | |
| 8,813,228 B2 | 8/2014 | Magee et al. | |
| 8,832,832 B1 | 9/2014 | Visbal | |
| 9,215,208 B2 | 12/2015 | Fraize et al. | |
| 9,270,449 B1* | 2/2016 | Tribble | H04L 63/0435 |
| 9,338,147 B1* | 5/2016 | Rothstein | H04L 63/0428 |
| 2001/0042204 A1 | 11/2001 | Blaker et al. | |
| 2002/0087708 A1 | 7/2002 | Low et al. | |
| 2002/0188839 A1 | 12/2002 | Noehring et al. | |
| 2003/0023846 A1 | 1/2003 | Krishna et al. | |
| 2003/0028585 A1 | 2/2003 | Yeager et al. | |
| 2003/0061507 A1 | 3/2003 | Xiong et al. | |
| 2003/0069973 A1 | 4/2003 | Ganesan et al. | |
| 2003/0135625 A1 | 7/2003 | Fontes et al. | |
| 2003/0187688 A1 | 10/2003 | Fey et al. | |
| 2003/0196081 A1 | 10/2003 | Savarda et al. | |
| 2003/0200456 A1 | 10/2003 | Cyr et al. | |
| 2004/0008711 A1 | 1/2004 | Lahti et al. | |
| 2004/0054807 A1 | 3/2004 | Harvey et al. | |
| 2004/0059943 A1 | 3/2004 | Marquet et al. | |
| 2004/0059951 A1 | 3/2004 | Pinkas et al. | |
| 2004/0059952 A1 | 3/2004 | Newport et al. | |
| 2004/0093524 A1 | 5/2004 | Sakai | |
| 2004/0111635 A1 | 6/2004 | Boivie et al. | |
| 2004/0143751 A1 | 7/2004 | Peikari | |
| 2004/0242200 A1 | 12/2004 | Maeoka et al. | |
| 2005/0021999 A1 | 1/2005 | Touitou et al. | |
| 2005/0036501 A1 | 2/2005 | Chung et al. | |
| 2005/0041584 A1 | 2/2005 | Lau et al. | |
| 2005/0044068 A1 | 2/2005 | Lin et al. | |
| 2005/0044270 A1 | 2/2005 | Grove et al. | |
| 2005/0108434 A1 | 5/2005 | Witchey | |
| 2005/0210243 A1 | 9/2005 | Archard et al. | |
| 2005/0257093 A1 | 11/2005 | Johnson et al. | |
| 2006/0056297 A1 | 3/2006 | Bryson et al. | |
| 2006/0061507 A1 | 3/2006 | Mohamadi | |
| 2006/0143707 A1 | 6/2006 | Song et al. | |
| 2006/0206936 A1 | 9/2006 | Liang et al. | |
| 2006/0212522 A1 | 9/2006 | Walter et al. | |
| 2006/0251057 A1 | 11/2006 | Kwon et al. | |
| 2006/0253902 A1 | 11/2006 | Rabadan et al. | |
| 2006/0256716 A1 | 11/2006 | Caci | |
| 2006/0265585 A1 | 11/2006 | Lai | |
| 2006/0288232 A1* | 12/2006 | Ho | G06F 21/6227 713/185 |
| 2006/0288411 A1 | 12/2006 | Garg et al. | |
| 2007/0056038 A1 | 3/2007 | Lok | |
| 2007/0073660 A1 | 3/2007 | Quinlan | |
| 2007/0079115 A1* | 4/2007 | Kresina | H04L 63/0428 713/153 |
| 2007/0291773 A1 | 12/2007 | Khan et al. | |
| 2008/0183885 A1 | 7/2008 | Durrey et al. | |
| 2008/0229418 A1 | 9/2008 | Chen et al. | |
| 2008/0256623 A1 | 10/2008 | Worley et al. | |
| 2009/0049198 A1 | 2/2009 | Blinn et al. | |
| 2009/0070470 A1 | 3/2009 | Bauman et al. | |
| 2009/0150996 A1 | 6/2009 | Haswell | |
| 2009/0168995 A1 | 7/2009 | Banga et al. | |
| 2009/0227228 A1 | 9/2009 | Hu et al. | |
| 2009/0241190 A1 | 9/2009 | Todd et al. | |
| 2009/0287941 A1 | 11/2009 | Shouno | |
| 2010/0106833 A1 | 4/2010 | Banerjee et al. | |
| 2010/0284300 A1 | 11/2010 | Deshpande et al. | |
| 2010/0286998 A1 | 11/2010 | Picken | |
| 2011/0022835 A1* | 1/2011 | Schibuk | G06Q 20/382 713/153 |
| 2011/0026537 A1 | 2/2011 | Kolhi et al. | |
| 2011/0029599 A1 | 2/2011 | Pulleyn et al. | |
| 2011/0047593 A1* | 2/2011 | Ausems | G06Q 20/0453 726/1 |
| 2011/0082947 A1 | 4/2011 | Szeto et al. | |
| 2011/0093785 A1 | 4/2011 | Lee et al. | |
| 2011/0131646 A1 | 6/2011 | Park et al. | |
| 2011/0153744 A1 | 6/2011 | Brown | |
| 2011/0249572 A1 | 10/2011 | Singhal et al. | |
| 2012/0036272 A1 | 2/2012 | El Zur | |
| 2012/0042060 A1 | 2/2012 | Jackowski et al. | |
| 2012/0110472 A1 | 5/2012 | Amrhein et al. | |
| 2012/0117646 A1 | 5/2012 | Yoon et al. | |
| 2012/0163186 A1 | 6/2012 | Wei et al. | |
| 2012/0174196 A1 | 7/2012 | Bhogavilli et al. | |
| 2012/0226582 A1 | 9/2012 | Hammad | |
| 2012/0284506 A1* | 11/2012 | Kravitz | G06Q 40/00 713/151 |
| 2012/0307631 A1 | 12/2012 | Yang et al. | |
| 2013/0019025 A1 | 1/2013 | Chaturvedi et al. | |
| 2013/0124713 A1 | 5/2013 | Feinberg et al. | |
| 2013/0128885 A1 | 5/2013 | Kardashov et al. | |
| 2013/0139245 A1 | 5/2013 | Thomas | |
| 2013/0173795 A1 | 7/2013 | McPherson | |
| 2013/0198385 A1 | 8/2013 | Han et al. | |
| 2013/0212265 A1 | 8/2013 | Rubio Vidales et al. | |
| 2014/0006508 A1 | 1/2014 | Goyet et al. | |
| 2014/0025568 A1 | 1/2014 | Smith et al. | |
| 2014/0095865 A1* | 4/2014 | Yerra | H04L 9/3265 713/156 |
| 2014/0137190 A1 | 5/2014 | Carey et al. | |
| 2014/0258489 A1 | 9/2014 | Muppala et al. | |
| 2014/0258536 A1 | 9/2014 | Chiong | |
| 2014/0259147 A1* | 9/2014 | L'Heureux et al. | H04L 63/02 726/14 |
| 2014/0269308 A1 | 9/2014 | Oshiba | |
| 2014/0280832 A1 | 9/2014 | Oshiba | |

(56) References Cited

U.S. PATENT DOCUMENTS

| | | |
|---|---|---|
| 2014/0283065 A1 | 9/2014 | Teddy et al. |
| 2014/0298091 A1 | 10/2014 | Carlen et al. |
| 2014/0310396 A1 | 10/2014 | Christodorescu et al. |
| 2014/0325588 A1 | 10/2014 | Jalan et al. |
| 2015/0033341 A1 | 1/2015 | Schmidtler et al. |
| 2015/0088597 A1 | 3/2015 | Doherty et al. |
| 2015/0312268 A1 | 10/2015 | Ray |
| 2015/0333988 A1 | 11/2015 | Jalan et al. |
| 2016/0036861 A1* | 2/2016 | Mattes ............... H04L 63/0272 726/1 |
| 2017/0111323 A1* | 4/2017 | Borkar ............... H04L 63/0281 |
| 2017/0214660 A1* | 7/2017 | Shah ............... H04L 63/0428 |

FOREIGN PATENT DOCUMENTS

| | | |
|---|---|---|
| HK | 1198848 A | 6/2015 |
| TW | 375721 | 12/1999 |
| TW | 477140 B | 2/2004 |
| TW | 574655 B | 2/2004 |
| TW | 576066 B | 2/2004 |
| TW | I225999 B | 1/2005 |
| TW | I252976 B | 4/2006 |
| WO | WO1998042108 A1 | 9/1998 |
| WO | WO2013112492 A1 | 8/2013 |
| WO | WO2014150617 A1 | 9/2014 |
| WO | WO2014151072 A1 | 9/2014 |
| WO | WO2014176461 A1 | 10/2014 |

OTHER PUBLICATIONS

Guo, Yuan-ni et al., "An Embedded Firewall System Design Based on Ptolemy II," Journal of System Simulation, vol. 16 No. 6, pp. 1361-1363, Jun. 2004.

Huang, Quan et al., "An Embedded Firewall Based on Network Processor," IEEE, 2nd International Conference on Embedded Software and Systems, 7 pages, Dec. 16-18, 2005.

Ihde, Michael et al., "Barbarians in the Gate: An Experimental Validation of NIC-Based Distributed Firewall Performance and Flood Tolerance," IEEE, International Conference on Dependable Systems and Networks, Jun. 25-28, 2006, 6 pages.

Susilo, W. et al., "Personal Firewall for Pocket PC 2003: Design & Implementation," IEEE 19th International Conference on Advanced Information Networking and Applications, vol. 2 pp. 661-666, Mar. 28-30, 2005.

"How to Create a Rule in Outlook 2003" CreateaRule—Outlook2003.doc 031405 mad, 3 pages.

Oracle Corporation, "Oracle Intelligent Agent User's Guide," Release 9.2.0, Part No. A96676-01, Mar. 2002, 36 pages.

F5 Networks, Inc., "SOL11243: iRules containing the RULE_INIT iRule event do not re-initialize when a syntax error is corrected," f5.support.com, May 24, 2010, 1 page.

Ganesan et al., "YAPPERS: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerIS," IEEE, pp. 279-288, Dec. 12-14, 2002.

Dainotti, Albert et al., "TIE: A Community-Oriented Traffic Classification Platform," May 11, 2009, Springer-Verlag, Traffic Monitoring and Analysis: Proceedings First International Workshop, TMA 2009. pp. 64-74. Retrieved from: Inspec. Accession No. 11061142.

Dainotti, Albert et al., "Early Classification of Network Traffic through Multi-Classification," Apr. 27, 2011, Springer Verlag, Traffic Monitoring and Analysis, Proceedings of the Third International Workshop, TMA 2011. pp. 122-135. Retrieved from INSPEC. Accession No. 12232145.

* cited by examiner

SSL GATEWAY WITH INTEGRATED HARDWARE SECURITY MODULE

TECHNICAL FIELD

This disclosure relates generally to data networks and, more specifically, to data networks employing a security gateway and one or more hardware security modules (HSMs).

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

During the past several years, users and businesses are adopting mobile computing and cloud computing at a fast pace. More and more users and companies are storing their data, personal and corporate, to a cloud, and are accessing their data from the cloud through the Internet. Although they are comfortable with the low cost of data storing and the convenience of data access through mobile and cloud applications, they are not comfortable with the security and protection of their data. Additionally, consumer users are concerned with loss of privacy, identity theft, and other harms that can be caused if their data are compromised during the storing or accessing sessions. Companies are concerned with fraud and data theft, leading to financial loss and harm caused to their clients.

Due to the above concerns, service providers and website owners offer secure services for storing and accessing data. Communication sessions between a client device and a server controlling the data are now mostly, if not entirely, encrypted. The usage of secure communication is becoming a dominant common method to access a web service, as opposed to previous use of secure communication reserved only for important or privileged services. Secure computing is a necessity of a critical server-side computing. Secure communication is becoming a must for server-side computing and a major part of client-side computing, particularly when a network gateway often acts as a proxy on behalf of a user terminal in a secure communication session. Unfortunately, today's secure communication computing is fast becoming a performance bottleneck for data traveling from client-side devices and server-side devices, and can introduce unwanted latency to data communication.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to methods for providing secure data communication through a security network system. According to one embodiment of the disclosure, the security network system may include a security gateway operable to establish a client session between the security gateway and a client device. The security gateway is also operable to receive client session information from the client session. The client session information includes an identification of a server with which the client device needs to exchange data. The security network system may also include a HSM in communication with the security gateway. The HSM is operable to establish, in concert with the security gateway, a secure session between the security gateway and the server based on the client session data, a public key, a secret key, and context attributed to the secure session.

According to another embodiment of the disclosure, a method for providing secure data communication through the security network system is provided. The method may commence with the security gateway establishing a client session between the security gateway and a client device. Further, the security gateway receives the client session information from the client session, wherein the client session information includes an identification of a server with which the client device needs to exchange data. The method also includes establishing, by the security gateway and the HSM, a secure session between the security gateway and the server based on the client session data, a public key, a secret key, and context attributed to the secure session.

Additional objects, advantages, and novel features will be set forth in part in the detailed description, which follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
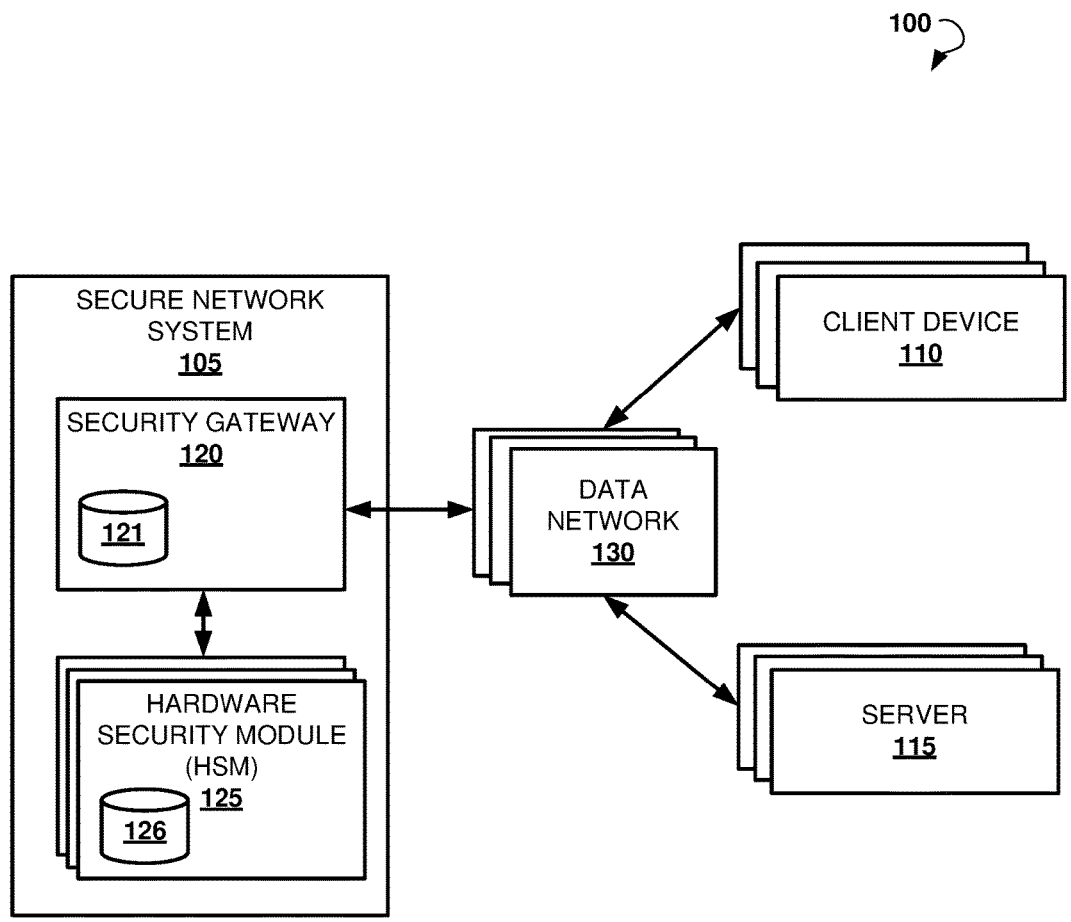
FIG. 1 illustrates an example embodiment of a computer environment within which methods and systems for providing secure data communication session can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

For purposes of this patent document, the term "and/or" shall mean "and" and "or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

The present disclosure relates to a system and methods for providing secure data communication between a client device and server. The system involves the employment of a Secure Sockets Layer (SSL) enabled security gateway and one or more HSMs in operative communication with the security gateway. The secure data communication includes establishing a client session between the security gateway and the client device and establishing a secure session between the security gateway and the server. Generally, the establishing of the secure session commences with retrieving client session information from the client session, because the client session information includes an identification of the server with which the client device needs to exchange data, among other things.

The establishing of the secure session continues with the security gateway sending a first request to the server, which includes at least a part of the client session information. In response to the first request, the server sends to the security gateway a security certificate and a public key. The security gateway may optionally determine that the security certificate obtained from the server is a valid security certificate or perform any other authentication or validation processes.

The security gateway then sends a second request to the HSM with the public key obtained from the server. In response to the receipt of the second request, the HSM generates a key entry in a storage of the HSM (e.g., in a public key data storage), and stores the public key obtained from the server in the key entry. The HSM then generates a key handle associated with the public key such that the key handle can uniquely identify or refer to the public key. The HSM sends the key handle to the security gateway so that the security gateway can generate a key handle entry in a local storage of the security gateway. The security gateway further stores the key handle received from the HSM in the key handle entry. The security gateway also sends a third request to the HSM, which causes the HSM to generate a context of the secure session between the security gateway and the server. The HSM also creates a secret, which can include at least one secret key (e.g., a private key) for data encryption or decryption.

The security gateway further sends a fourth request to the HSM, which includes the key handle from the storage of the security gateway. In response to the receipt of the fourth request, the HSM matches the key handle from the storage of the security gateway with the key entry stored in the storage of the HSM. Based on a result of the matching, the HSM retrieves the public key and the secret. The HSM then encrypts the secret using the public key, generates a SSL message including the secret encrypted using the public key, and sends the SSL message to the security gateway. When the SSL message is received, the security gateway sends the SSL message to the server so as to cause the server to decrypt the SSL message and retrieve the secret from the SSL message. Based on the secret, by the security gateway and the server establish the secure session enabling the security gateway to exchange encrypted data packets with the server encrypted, where the encrypted data packets can be decrypted by the server using the secret.

Referring now to the drawings, FIG. 1 illustrates an example embodiment of computer environment 100 within which methods and systems for providing a secure data communication session can be implemented. The computer environment 100 includes a secure network system 105, which is configured to establish a secure communication session between a client device 105 and a server 115. In one example embodiment, the secure network system 105 includes a security gateway 120, and at least one HSM 125. The security gateway 120 and at least one HSM 125 are configured to provide secure services to the client device 110 and to the server 115. For example, the secure services can include a secure communication (including encrypted communication) between the client device 110 and to the server 115.

The client device 110 can refer to a personal computer, a laptop computer, tablet computer, smartphone, mobile phone, Internet phone, netbook, home gateway, broadband gateway, network appliance, set top box, media server, personal media play, personal digital assistant, access gateway, networking switch, server computer, network storage computer, game console, entertainment system, infotainment system, vehicle computer, or any other computing device comprising at least a network module and a processor module. In certain embodiments, the computer environment 100 can include a plurality of client devices 110, each of which can communicate with the security gateway 120 as described herein.

The server 115 can refer to both a physical machine and software on the machine that can store, receive, send, process, and generate data such as files, data packets, data communications, and the like.

The security gateway 120 can refer to a gateway application (software or middleware); however, this term can also encompass any server or computing device configured to perform any or all of the functionality described below. In one embodiment, the security gateway 120 is configured to communicate to the client device 110 and the server device 115 using one or more communication sessions. The security gateway 120 can include or communicate with a storage 121 for storing communication related information, logs, keys, certificates, passwords, and the like.

As shown in the figure, the security gateway 120 can be communicatively connected to the client device 110 and the server 115 over a data network 130. In one embodiment, the security gateway 120 connects to the client device 110 in a data network different from a data network connecting the security gateway 120 and the server 115. Thus, the data network 130 can include two or more data sub-networks for the connections. In other embodiments, the data network 130 is a single network environment for connection between the security gateway 120, the client device 110, and the server 115. The data network 130 can also communicate to other external devices, external computing devices, servers, and networked systems.

According to various embodiments, the data network 130 refers to any wired, wireless, or optical networks including, for example, the Internet, intranet, local area network (LAN), a Personal Area Network (PAN), wide area network (WAN), a virtual private network (VPN), cellular phone networks (e.g. Global System for Mobile (GSM) communications network, packet switching communications network, circuit switching communications network), Bluetooth radio, Ethernet network, an IEEE 802.11-based radio frequency network, a Frame Relay network, Internet Protocol (IP) communications network, or any other data communication network utilizing physical layers, link layer capability, or network layers to carry data packets, or any combinations of the above-listed data networks. In some embodiments, the data network 130 includes a corporate network, a data center network, a service provider network, a mobile operator network, or any combinations thereof.

The HSM 125 refers to a hardware device or server that safeguards and manages digital keys for authentication and cryptographic purposes. The HSM 125 can come in the form of a plug-in card, stand-alone network computer, server, or an external device that connects to a computer or network server such as the security gateway 120. The HSM 125 can provide additional safeguards by storing and using security information including, but not limited to, keys, digital certificates, passwords, passphrases, two-factor authentication information, personal identification numbers, and so forth. In some embodiments, one or more HSMs 125 may be employed to support one or more standard public key infrastructures. The HSMs 125 may be also employed to generate, manage, and/or store keys pairs. Accordingly, the HSM 125 may include one or more memory elements such as storage 126 for storing keys (e.g., public keys).

Figure 2:
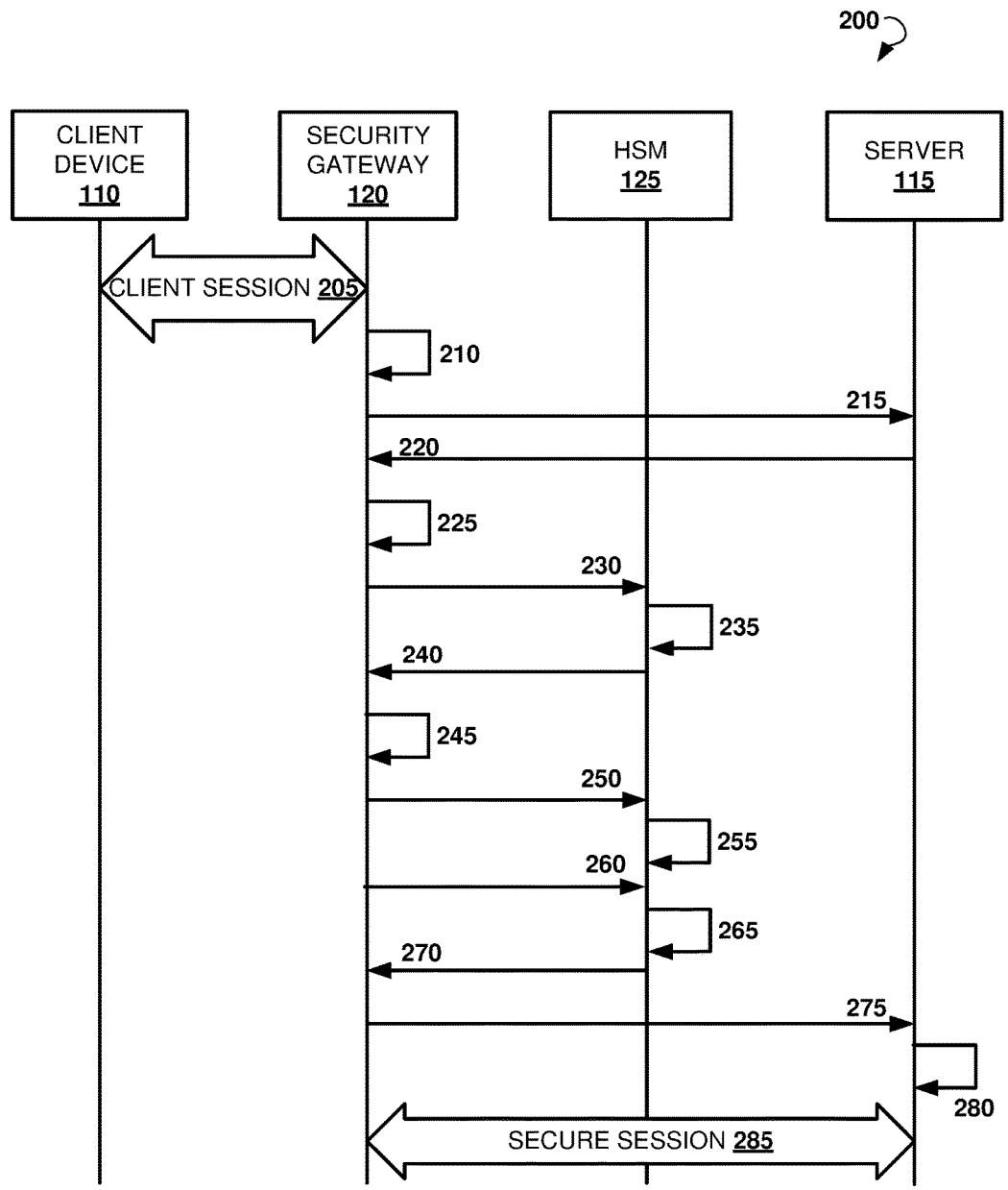
FIG. 2 illustrates a time diagram of a method for providing a secure data communication session.

FIG. 2 illustrates a time diagram of a method 200 for providing secure data communication session according to one example embodiment. The method 200 may be performed by processing logic that may comprise hardware (e.g., decision-making logic, dedicated logic, programmable logic, application-specific integrated circuit (ASIC), and microcode), software (such as software run on a general-purpose computer system or a dedicated machine), or a combination of both. In one example embodiment, the method 200 is implemented by the devices the computer environment 100. Notably, below recited steps of method 200 may be implemented in an order different than described and shown in the figure. Moreover, the method 200 may have additional steps not shown herein, but which can be evident for those skilled in the art from the present disclosure. The method 200 may also have fewer steps than outlined below and shown in FIG. 2.

Referring now to both FIG. 1 and FIG. 2, the method 200 is described. At step 205, the security gateway 120 establishes a client session with the client device 110 for data exchange. In step 210, the security gateway 120 receives and processes information from the client session so as to establish a connection to the server 115 over one or more secure sessions in the following steps. In one embodiment, the secure session can be established while processing the client session. In another embodiment, however, the secure session is established as a result of processed client session. The information of the client session can include details of the server 115 (e.g., identification of the server 115) with which the client device 110 needs to exchange data.

More specifically, at step 215, the security gateway 120 sends a request to the server 115 to establish the secure session based on information obtained from the client session. At step 220, in response to the request, the server 115 sends a security certificate and a public key. Upon receiving the security certificate, in one embodiment, the security gateway 120 verifies the security certificate for its validity based on one or more predetermined rules and information stored in the security gateway 120. Thus, in step 225, the security gateway 120 determines that the security certificate is valid.

In some embodiments, the security certificate (e.g., as provided by the server 115 in step 220) includes an Internet security certificate, an SSL certificate, a Certification Authority (CA) certificate, a corporate issued security certificate, a network generated security certificate, a trusted security certificate, a user certificate, or any other digital security certificate used between peers of secure data communication session, or any combinations thereof. In one embodiment, the security certificate includes one or more of the following: a digital signature, a key for encryption, a key for decryption, a cipher method parameter, an identity, meta-data, and so forth. In yet more embodiments, the server certificate includes the public key or any other data encryption key. In other embodiments, however, the public key is not included in the security certificate. The term "public key" refers to a key used for data encryption employed in cryptography or cryptography system such as Public-key Cryptography, asymmetric cryptography, or RSA cryptosystem.

Further, in step 230, the security gateway 120 requests HSM 125 to store the public key obtained from the server 115. For these ends, the security gateway 120 sends the public key to one predetermined HSM 125. In one embodiment, in response to the receipt of the public key, in step 235, the HSM 125 generates a key entry in the storage 126 to store the public key. Thus, the storage 126 of the HSM 125 can store one or more public keys.

In some embodiments, the key entry in the storage 126 includes a key handle, which the HSM 125 generates and uses to reference the key entry. Each key handle can be uniquely associated with its respective public key. Thus, the key handle is sufficient to uniquely identify the public key in the storage 126.

In step 240, the HSM 403 sends the key handle to the security gateway 120. Further, when the security gateway 120 receives the key handle, in step 245, the security gateway 120 generates a key handle entry in the storage 121 and stores the received key handle into the key handle entry. In certain embodiments, the security gateway 120 also stores the security certificate (which was received from the server 115) and the public key into the key handle entry.

In step 250, the security gateway 120 requests the HSM 125 to create a context for the secure session between the security gateway 120 and the server 115. In certain embodiments, the context refers to data or meta-data associated with the secure session. For example, the context can uniquely identify or describe the secure session.

In step 255, the HSM 125 creates the context and a secret based on one or more characteristics of the secure session between the security gateway 120 and the server 115. Generally, the secret includes one or more secret keys used in cryptography and, more specifically, in encryption and decryption of data over the secure session. In one embodiment, the secret includes a secret key for data encryption or decryption. In additional embodiments, the secret can include one or more of the following: a secret key used in a SSL session, a secret key used in transport layer security (TLS) session, a secret key used in crypto-algorithms such as Secure Hash Algorithms (SHA), Message Digest Algorithms (MD2, MD4, MD5, MD6, etc.), a secret key used in GOST hash functions, a secret key used in any other data encryption algorithms. The secret can be included in the context.

Further, in step 260, the security gateway 120 requests the HSM 125 to encrypt the secret using the public key. For these ends, the security gateway 120 sends the HSM 125 a request for an encrypted secret message. This request may include the context and the key handle from the storage 121 of the security gateway 120.

In step 265, the HSM 125 matches the key handle from the storage 121 of the security gateway 120 to the key entry stored in the storage 126 of the HSM 125, and retrieves the public key based on a result of the matching. The HSM 125 also retrieves the secret from the context. In step 270, the HSM 125 encrypts the secret using the public key, generates a SSL message for the secret encrypted using the public key, and sends the encrypted SSL message to the security gateway 120. In step 275, the security gateway 120 sends the encrypted SSL message to the server 115. Further, in step 280, the server 115 decrypts the encrypted SSL message and retrieves the secret therefrom. In the next step, 285, both the security gateway 120 and the server 115 can subsequently exchange secure data packets encrypted and decrypted using the secret retrieved from the encrypted SSL message. Thus, the steps 215-280 establish the secure session between the security gateway 120 and the server 115. Since the security gateway 120 also has the client session established in the step 205 between the security gateway 120 and the client device 110, the method 200 enables secure data communication between the client device 110 and the server 115 through the security gateway 120.

In some embodiments, the secret includes a pre-master secret key and a master secret key to be in compliance with one or more security standards such as SSL, Transport Layer Security (TLS), or Rivest-Shamir-Adleman (RSA) cryptosystem for public-key encryption.

Still referring to FIG. 2, in step 290, the security gateway 120 can determine that the secure session between the security gateway 120 and the server 115 is no longer in use or disconnected. In this case, in step 295, the security gateway 120 informs the HSM 125 that the context is no longer needed. In response to this information, the HSM 125 deletes the context.

In certain embodiments, the security gateway 125 can repeatedly monitor the need for establishing one or more secure sessions with one or more servers 115. When the security gateway 125 determines that another secure session with the server 115 is needed, the security gateway 120 can re-use the key handle entry generated in step 245 for the new secure session.

Still referring to FIG. 1 and FIG. 2, in some embodiments, the method 200 enables the server 115, using the secure session, to serve the client session requested indirectly by the client device 110 via the security gateway 120. In certain embodiments, the client session includes a service session such as a Hyper Text Transfer Protocol (HTTP) session, a file transfer session, a remote access session, a File Transfer Protocol (FTP) session, a voice over Internet Protocol (VoIP) session, a Session Initiation Protocol (SIP) session, a video or audio streaming session, a e-commerce session, an enterprise application session, an email session, an online gaming session, a teleconference session, a Web-based communication session, or any other communication session, or any combination thereof. Moreover, in certain embodiments, the client session or the secure session includes a service session with security such as a secure session, a TLS session, an Internet Protocol Security (IPSec) session, a secure Transmission Control Protocol (TCP) session, a secure Web session, a secure VPN session, a secure voice over IP session, a secure video or audio streaming session, a secure conferencing session, a secure document access session, a secure network access session, a secure e-commerce session, a secure business-to-business transaction session, a secure financial transaction session, a secure collaboration session, a secure on-line game session, any other communication session, or any combination thereof.

In yet additional embodiments, the security gateway 120 provides for one or more of functionality of a firewall, a SSL proxy gateway, a Server Load Balancer (SLB), an Application Delivery Controller (ADC), a Threat Protection System (TPS), a secure traffic manager, a legal interception gateway, a VPN gateway, a TCP proxy gateway, any other gateway, or any combination thereof.

In certain embodiments, the security gateway 120 includes two or more network nodes (connected to one or more data networks 130), where one network node processes the client session with the client device 110 and another network node processes the secure session with the server 115. In other embodiments, the security gateway 120 includes a security application to process intercepted secure session data traffic. The security application may provide virus detection functionality, credit card fraud detection functionality, document or identity theft detection functionality, session recording functionality, cyber-attack detection functionality, company security policy processing, government security policy processing, compliant processing, or any other security functionality, or any combination thereof.

Figure 3:
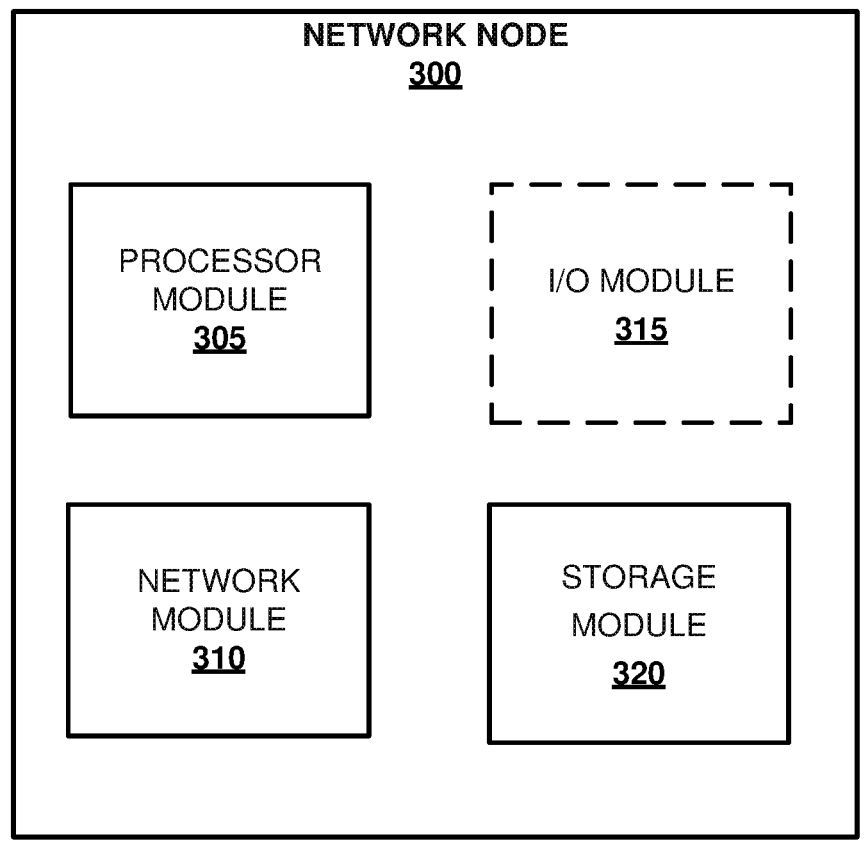
FIG. 3 illustrates an example embodiment of a network node or a network computer that can be used as a security gateway, client device, or server.

FIG. 3 illustrates an example embodiment of a network node 300 or a network computer that can be used as the security gateway 120, the client device 110, or the server 115. In one embodiment, the network node 300 includes a processor module 305, a network module 310, an optional input/output (I/O) module 315, and a computer storage module 320. These elements may be interconnected via a local microprocessor bus, one or more I/O buses, or the like.

The processor module 305 may include one or more processors such as microprocessors, microcontrollers, processors, central-computing units (CPUs), and so forth. In addition, the processor module 305 can include one or more processor cores embedded in a processor. In some embodiments, the processor module 305 includes one or more embedded processors, or embedded processing elements in the form of a Field Programmable Gate Array (FPGA), an ASIC, or a Digital Signal Processor (DSP).

The network module 310 can be utilized to communicate with external devices, external computing devices, servers, and networked systems via one or more wired, wireless, or optical networks including, for example, the Internet, intranet, LAN, WAN, T1/T3 interface, cellular phone networks, Bluetooth radio, Ethernet, IEEE 802.11-based interface, among others. The network module 310 may be a network interface card, such as an Ethernet card, optical transceiver, radio frequency transceiver, or any other type of device that can send and receive information. In some embodiments, the network module 310 includes a network processor.

The I/O module 315 provides a portion of a user interface. Input devices of the I/O module 315 may include an alphanumeric keypad, such as a keyboard, for inputting alphanumeric and other information, or a pointing device, such as a mouse, trackball, stylus, cursor direction keys, motion detector, camera, microphone, and so forth. Output devices of the I/O module 315 can include suitable output devices including displays, touchscreens, projectors, speakers, printers, haptic devices, and so forth.

The computer storage module 320 provides data storage functions. The computer storage module 320 may be implemented as a non-volatile computer-readable medium such as, for example, a magnetic disk drive, magnetic memory device, optical disk drive, optical memory device, solid-state disk drive, solid-state memory device, Read-Only Memory (ROM), or any other optical medium, any other physical medium with patterns of marks or holes, Random-Access Memory (RAM), Programmable Read-Only Memory (PROM), Erasable Programmable Read-Only Memory (EPROM), any other memory chip or cartridge, a carrier wave, or any other medium from which a computer can read. The computer storage module 320 can store system software and data (e.g., secure certificates, public and provide keys, secrets, key handles, key entries, context, etc.) for implementing at least some of method steps described herein.

Figure 4:
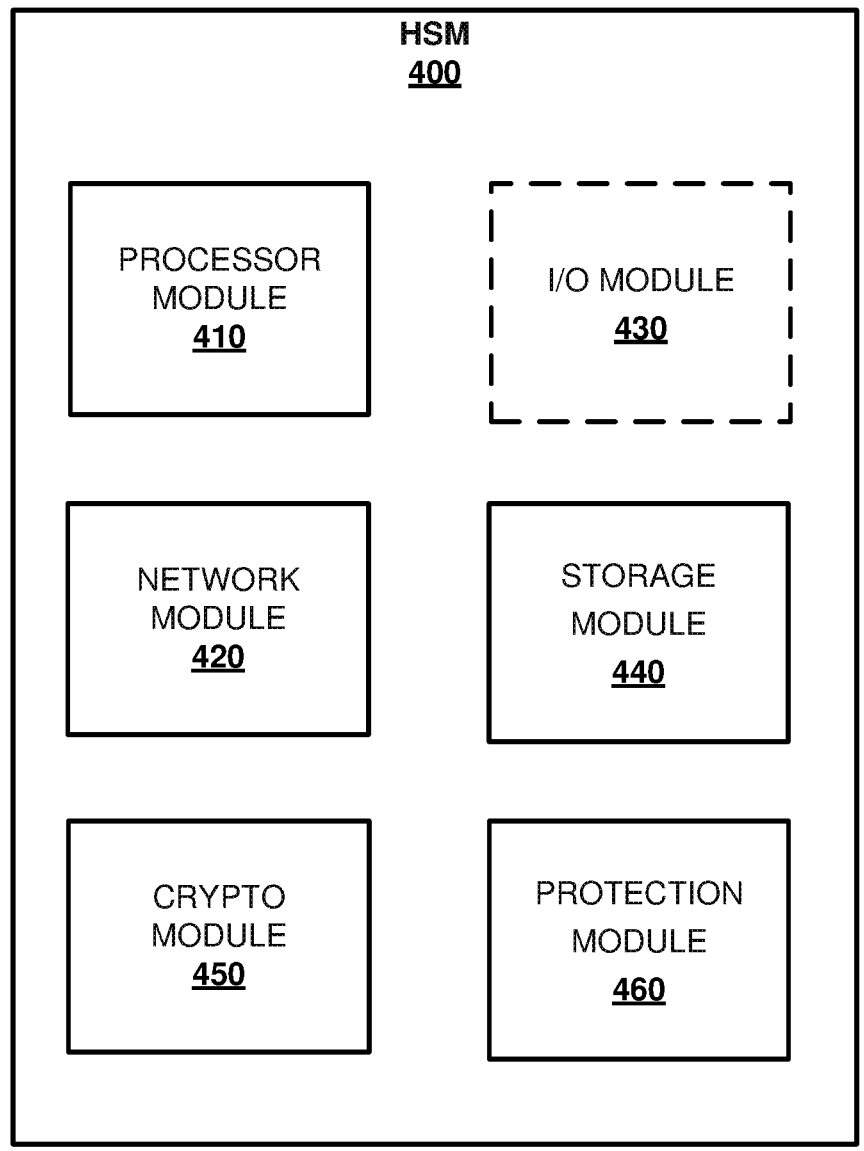
FIG. 4 illustrates an example HSM.

FIG. 4 illustrates an exemplary embodiment of a HSM 400. In this embodiment, the HSM 400 includes one or more component modules of a network node. The component modules may include a processor module 410, a network module 420, an optional I/O module 430, and a storage module 440.

The processor module 410 may include one or more processors such as microprocessors, microcontrollers, processors, CPUs, and so forth. In addition, the processor module 410 can include one or more processor cores embedded in a processor. In some embodiments, the processor module 410 includes one or more embedded processors, or embedded processing elements in the form of a FPGA, ASICs, or DSPs.

The network module 420 can be utilized to communicate with external devices, external computing devices, network nodes, servers, and networked systems via one or more communications networks such as one or more wired, wireless, or optical networks including, for example, the Internet, intranet, LAN, WAN, T1/T3 interface, cellular phone networks, Bluetooth radio, Ethernet, IEEE 802.11-based interface, among others. The network module 420 may be a network interface card, such as an Ethernet card, optical transceiver, radio frequency transceiver, or any other type of device that can send and receive information. In some embodiments, the network module 420 includes a network processor.

The I/O module 430 provides at least a portion of a user interface. Input devices of the I/O module 430 may include an alphanumeric keypad, such as a keyboard, for inputting alphanumeric and other information, or a pointing device, such as a mouse, trackball, stylus, cursor direction keys, motion detector, camera, microphone, and so forth. Output devices of the I/O module 430 can include suitable output devices including displays, touchscreens, projectors, speakers, printers, haptic devices, and so forth.

The computer storage module 440 provides data storage functions. The computer storage module 440 may be implemented as a non-volatile computer-readable medium such as, for example, a magnetic disk drive, magnetic memory device, optical disk drive, optical memory device, solid-state disk drive, solid-state memory device, ROM, or any other optical medium, any other physical medium with patterns of marks or holes, RAM, PROM, EPROM, any other memory chip or cartridge, a carrier wave, or any other medium from which a computer can read. The computer storage module 440 can store system software or data (e.g., secure certificates, public and private keys, secrets, key handles, key entries, context, etc.) for implementing at least some of the method steps described herein.

In certain embodiments, the HSM 400 also includes a crypto module 450, which may include one or more hardware-based crypto processing units, ASICs, or FPGAs for cryptographic calculation, encryption and decryption, random number generation, or security key generation.

Moreover, in some implementations, the HSM 400 includes a protection module 460, which is configured to detect hardware changes or power changes. In some embodiments, the processor module 410, being aware of a hardware change or a power change detected by the protection module 460, disables the storage module 440 such that critical data stored in the storage module 440 becomes unusable.

Figure 5:
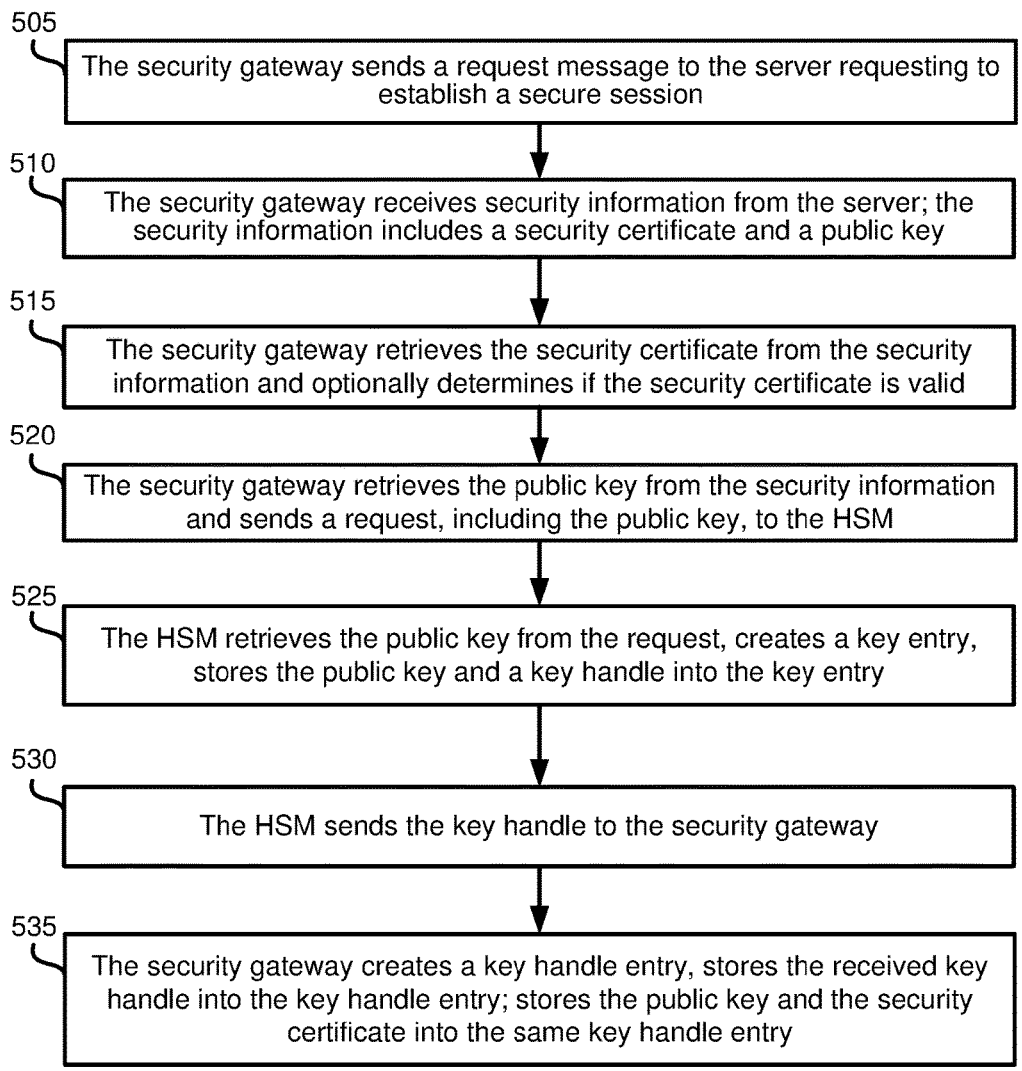
FIG. 5 is a flow diagram showing operations of a method for obtaining security information by a security gateway from a server for establishing a secure session.

FIG. 5 is a flow diagram showing operations of a method 500 for obtaining security information by a security gateway from a server for establishing a secure session, according to an example embodiment. In some embodiments, the steps of method 500 may be combined, performed in parallel, or performed in a different order. The method 500 may also include additional or fewer steps than those illustrated. The method 500 can be implemented with one or more modules or devices shown in FIG. 1 and described above.

The method 500 can commence with the security gateway 120 sending, in step 505, a request message to the server 115 requesting to establish a secure session between the security gateway 120 and the server device 115. In some embodiments, the request message includes a client hello message, a handshake message, or the like.

In step 510, the security gateway 120 receives security information from the server 115 over one or more messages as a response to the request message sent in the step 505. As discussed above, the security information may include a security certificate and a public key from server 115. In certain embodiments, the security information may include two or more security certificates and/or two or more public keys from server 115.

In step 515, the security gateway 120 can retrieve the security certificate from the security information received from the server 115. In some embodiments, the security gateway 120 can also determine if the security certificate (when retrieved from the security information) is valid or authentic. The validation process can include the operations of determining, by the security gateway 120, if the security certificate indicates a CA and, if it does, the security gateway 120 then uses the CA to validate the security certificate using one or more external servers or web services. When the security gateway 120 validates the security certificate is valid, the method 500 can proceed to subsequent steps.

In step 520, the security gateway 120 retrieves the public key from the security information and sends a request to the HSM 125. The request of the security gateway 120 can include the public key. Moreover, the request of the security gateway 120 causes the HSM 125 to store the public key in the storage 126.

In step 525, the HSM 125 retrieves the public key from the request, creates a key entry, and stores the public key in the key entry. In some embodiments, the HSM 125 also stores a key handle in the key entry. In some embodiments, the HSM 125 uses the key handle to reference the key entry. The key entry can refer to an entry stored in a table (e.g., in the storage 126), and the key handle can refer to a table index reference to the key entry stored in the table.

In step 530, the HSM 125 further sends the key handle to the security gateway 120, as a response to the request to store the public key. Subsequently, the security gateway 120 receives the key handle. In step 535, the security gateway 120 creates a key handle entry and stores the received key handle into the key handle entry (e.g., using the storage 121). In one embodiment, the security gateway 120 further stores the public key and the security certificate into the same key handle entry.

Figure 6:
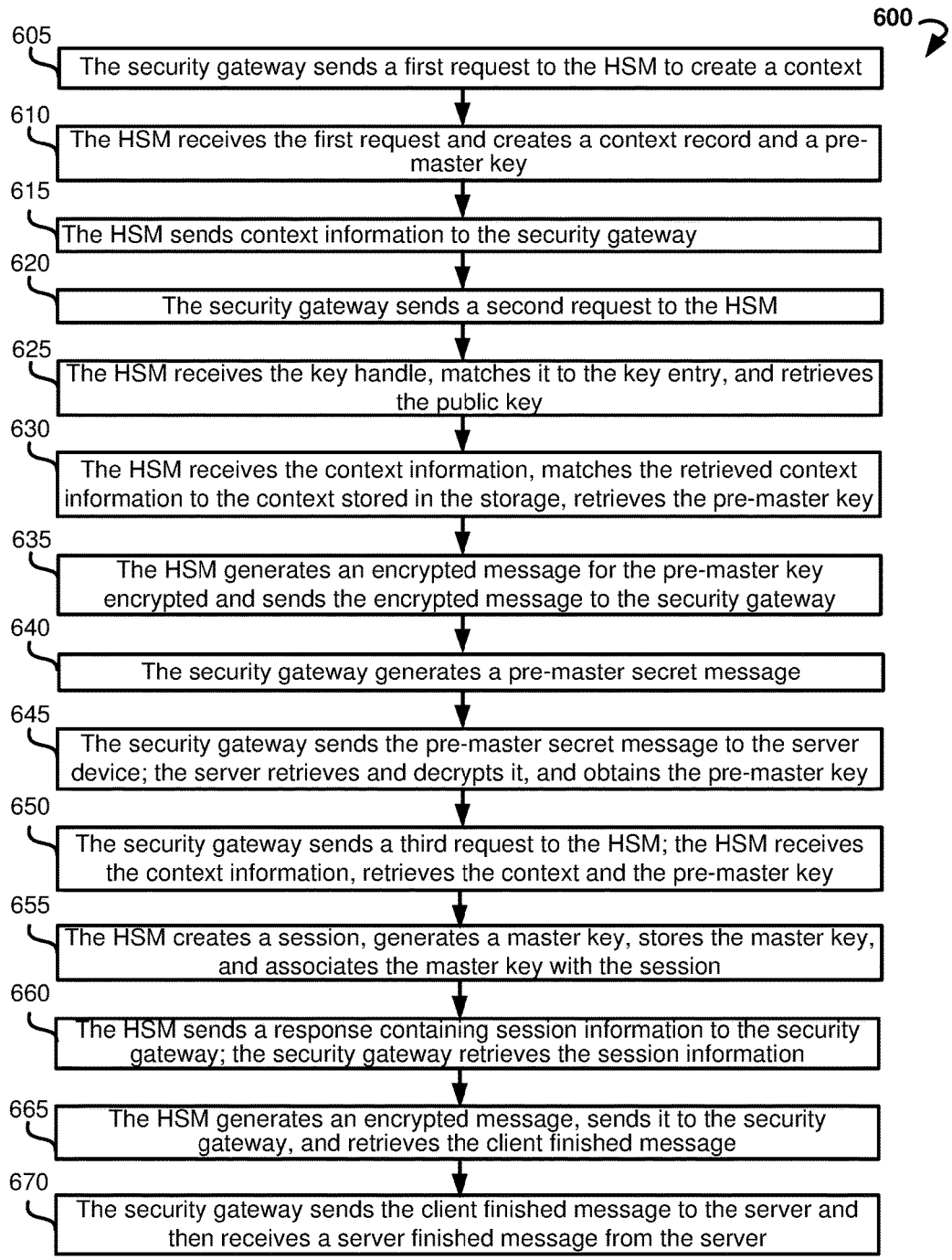
FIG. 6 is a flow diagram showing operations of a method for establishing a secure session using a secret.

FIG. 6 is a flow diagram showing operations of a method 600 for establishing a secure session using a secret, according to an example embodiment. In some embodiments, the steps of method 600 may be combined, performed in parallel, or performed in a different order. The method 600 may also include additional or fewer steps than those illustrated. The method 600 can be implemented with one or more modules or devices shown in FIG. 1 and described above.

The method 600 can commence with the security gateway 120 sending, in step 605, a first request to the HSM 125 to create a context. In certain embodiments, the context can include data associated with a secure session. For example, the context can uniquely identify, reference, or describe the secure session, its attributes, or network nodes involved or to be involved into the secure session.

In step 610, the HSM 125 receives the first request from the security gateway 120 and creates the context (e.g., a context record) in response to the request. In some embodiments, the HSM 125 also creates a secret and associates the secret to the context. Moreover, the HSM 125 can also create a pre-master key (e.g., a pre-master data encryption key) during the process of creating the secret. The pre-master key can be contained or associated with the secret. In step 615, the HSM 125 sends context information (e.g., the context record) to the security gateway 120.

In step 620, in response to the receipt of the context information, the security gateway 120 sends a second request to the HSM 125 to generate an encrypted message based on the pre-master key. The security gateway 120 includes the key handle and the context information in the second request.

In step 625, the HSM 125 receives the key handle from the second request, matches the key handle to the key entry, and retrieves the public key from the key entry. Further, in step 630, the HSM 125 receives the context information from the second request, matches the retrieved context information to the context stored in the storage 126, and retrieves the pre-master key of the context from the secret.

In step 635, the HSM 125 generates an encrypted message for the pre-master key encrypted using the public key, and the HSM 125 sends the encrypted message to the security gateway 120. In step 640, in response to the receipt of the encrypted message by the security gateway 120, the security gateway 120 generates a pre-master secret message from the encrypted message. In some embodiments, however, the encrypted message is the pre-master secret message.

In step 645, the security gateway 120 sends the pre-master secret message to the server device 115 over a secure session. In one embodiment, the server device 115 retrieves the pre-master secret message, decrypts the pre-master secret message, and obtains the pre-master key from the pre-master secret message.

In step 650, the security gateway 120 sends a third request to the HSM 125 to create a session based on the context. Further in this step, the HSM 125 receives the context information in the third request from the security gateway 120, uses the context information to retrieve the context, and retrieves the pre-master key in the secret associated to the context.

In step 655, the HSM 125 creates a session (e.g., a communication session for communicating with the server 115) and generates a master key (e.g., a master data encryption key) based on the pre-master key. In some embodiments, the HSM 125 stores the master key into the secret and associates the master key with the session. The HSM 125 can also store the master key into the session.

In step 660, the HSM 125 sends a response containing session information associated with the session to the security gateway 120. The security gateway 120 retrieves the session information from the response and associates the session information to the secure session with the server 115.

In step 665, the HSM 125 generates a message encrypted using the master key. In one embodiment, the encrypted message is a client finished message or a message to indicate that the client device is ready. The HSM 125 sends the encrypted message to the security gateway 120 and retrieves the client finished message. In some embodiments, the security gateway 120 receives the client finished message as a response to the third request sent in step 650. In other embodiments, however, the security gateway 120 sends a fourth request to the HSM 125 in order to receive the client finished message.

In step 670, the security gateway 120 sends the client finished message to the server 115 and then receives a server finished message (which can be encrypted) from the server 115. The server finished message indicates that the secure session is properly established with the server 115. In one embodiment, the security gateway 120 further requests the HSM 125 to decrypt the server finished message according to the session information.

Figure 7:
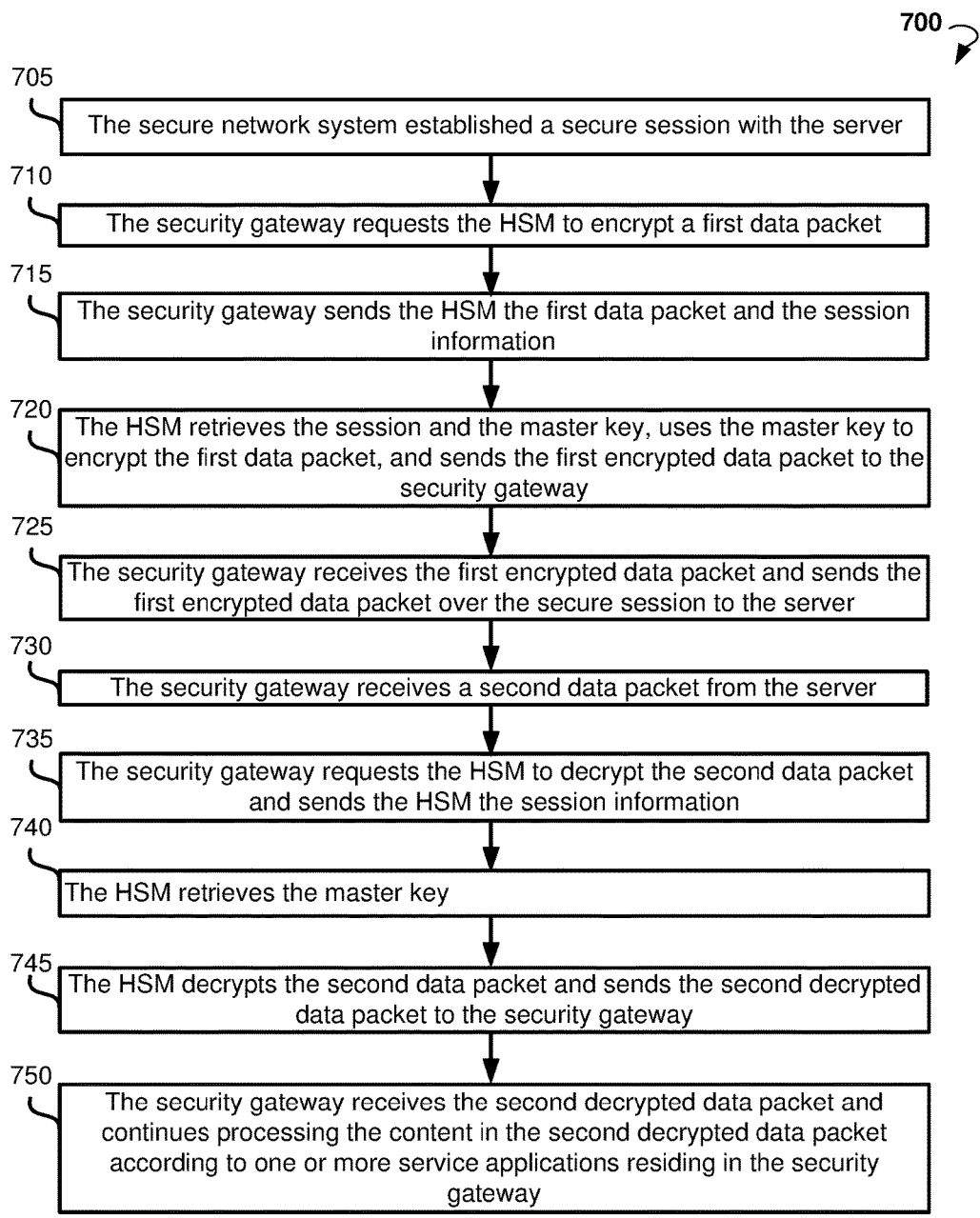
FIG. 7 is a flow diagram showing operations of a method for exchanging secure data packets between the secure network system and the server device over a secure session.

FIG. 7 is a flow diagram showing operations of a method 700 for exchanging secure data packets between the secure network system 105 and the server device 115 over a secure session, according to an example embodiment. In some embodiments, the steps of method 700 may be combined, performed in parallel, or performed in a different order. The method 700 may also include additional or fewer steps than those illustrated. The method 700 can be implemented with one or more modules or devices shown in FIG. 1 and described above.

In step 705, the secure network system 105 has established a secure session with the server 115 as illustrated earlier in this document. In certain embodiments, the security gateway 120 needs to send a first data packet (or a plurality of data packets) over the secure session to the server 115. For these ends, in step 710, the security gateway 120 requests the HSM 125 to encrypt the first data packet for the session (e.g., the session created in step 655).

In step 715, the security gateway 120 also sends the HSM 125 the first data packet and the session information (e.g., the session information retrieved earlier in step 660 of FIG. 6). In step 720, the HSM 125, upon receiving the request from the security gateway 120, retrieves the session using the session information. Moreover, the HSM 125 retrieves the master key from the session and uses the master key as an encryption key to encrypt the first data packet (thereby, generating a first encrypted data packet). Subsequently, the HSM 125 sends the first encrypted data packet to the security gateway 120.

In step 725, the security gateway 120 receives the first encrypted data packet received from the HSM 125 and sends the first encrypted data packet over the secure session to the server 115. In step 730, the security gateway 120 receives a second data packet over the secure session from the server 115. In step 735, the security gateway 120 requests the HSM 125 to decrypt the second data packet. Moreover, in the same step, the security gateway 120 sends the HSM 125 the session information. In step 740, the HSM 125 retrieves the master key from the session according to the session information as received from the security gateway 120.

In step 745, the HSM 125 further decrypts the second data packet (to produce a second decrypted data packet) and sends the second decrypted data packet to the security gateway 120. In step 750, the security gateway 120 receives the second decrypted data packet and continues processing the content in the second decrypted data packet according to one or more service applications residing in the security gateway 120.

Figure 8:
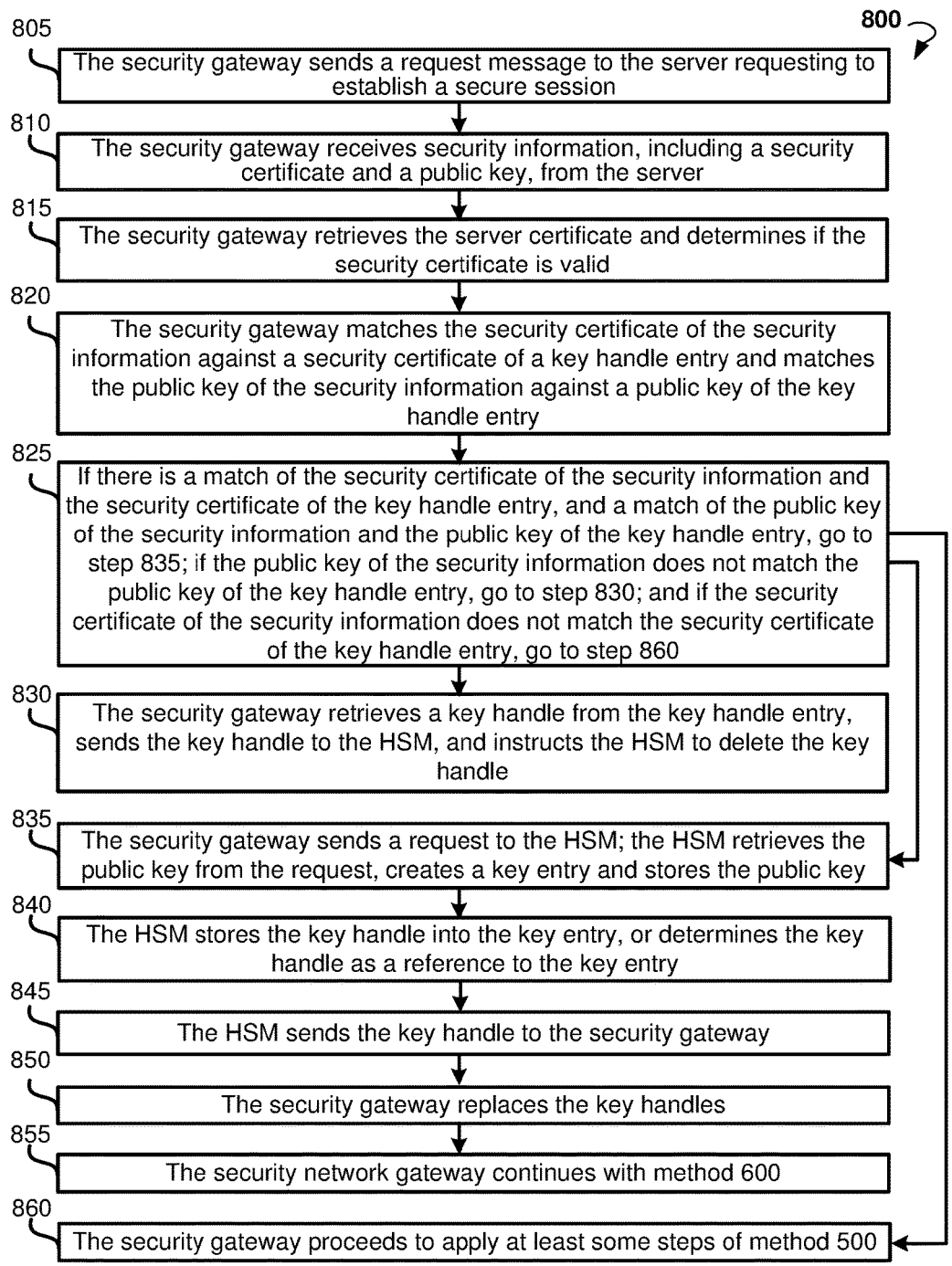
FIG. 8 is a flow diagram showing operations of a method for establishing a second secure session between a secure network system and server device.

FIG. 8 is a flow diagram showing operations of a method 800 for establishing a second secure session between the secure network system 105 and the server device 115, according to an example embodiment. In some embodiments, the steps of method 800 may be combined, performed in parallel, or performed in a different order. The method 800 may also include additional or fewer steps than those illustrated. The method 800 can be implemented with one or more modules or devices shown in FIG. 1 and described above.

The method 800 commences when the secure network system 105 attempts to establish a second secure session with the server 115 (e.g., in response to a client request originated from the client device 110). In step 805, the security gateway 120 sends a request message to the server 115 requesting to establish a secure session. In step 810, the security gateway 120 receives security information from the server 115 over one or more response messages. The security information includes a security certificate and a public key from the server 115.

In step 815, the security gateway 120 retrieves the server certificate and determines if the security certificate is valid. In step 820, the security gateway 120 matches the security information against a key handle entry. Particularly, the security gateway 120 matches the security certificate of the security information against a security certificate of a key handle entry (e.g., stored in the storage 121), and matches the public key of the security information against a public key of the key handle entry.

In step 825, the security gateway 120 determines if there is a match of the security certificate of the security information and the security certificate of the key handle entry, and if there is a match of the public key of the security information and the public key of the key handle entry. Based on the determination, the security gateway 120 concludes that the security information matches the key handle entry and the method 800 proceeds to step 835.

If in step 825, the security gateway 120 determines that the security certificate of the security information matches the security certificate of the key handle entry, but the public key of the security information does not match the public key of the key handle entry, the method 800 proceeds to step 830. In step 830, the security gateway 120 retrieves a key handle from the key handle entry. Next, the security gateway 120 sends the key handle to the HSM 125 and instructs the HSM 125 to delete the key handle. The HSM 125 retrieves the key entry corresponding to the received key handle and deletes the key entry. In some embodiments, the HSM 125 also removes the key entry from a memory of HSM 125 such as the storage 126.

In step 835, the security gateway 120 sends a request containing the public key to the HSM 125 to store the public key (e.g., in the storage 126). In response to receipt of the request, the HSM 126 retrieves the public key from the request, creates a key entry, and stores the public key into this key entry.

In step 840, the HSM 125 stores the key handle into the key entry, or determines the key handle as a reference to the key entry. In step 845, the HSM 125 sends the key handle to the security gateway 120 as a response to the request to store the public key. Subsequently, the security gateway 120 receives the key handle from the response of the HSM 125.

In step 850, the security gateway 120 replaces the key handle of the key handle entry with the key handle from the HSM response. The security gateway 120 also replaces the public key of the key handle entry with the public key of the security information. Further, the security gateway 120 deletes the existing key handle and creates a new key handle entry to store the security certificate of the security information, the public key of the security information, and the key handle. The security gateway 120 further stores the public key of the key handle entry and the security certificate of the key handle entry into the key handle entry. In step 855, the security network gateway 105 continues with steps, similar to steps of method 600 to exchange a secret with the server 115 for the secure session.

If in step 825, the security gateway 120 determines that the security certificate of the security information does not match the security certificate of the key handle entry, the method 800 proceeds to step 860. In step 860, the security gateway 120 proceeds to apply at least some steps of method 500 to cause the security gateway 120 to request the HSM 125 to create a key entry with a key handle, to store the public key, and to create a new key handle entry to store the security certificate of the security information, the public key of the security information and the key handle received from the HSM 125. Upon storing the public key, in step 865, the security network gateway 105 applies at least some steps of method 600, using the created key handle entry and the key entry, to exchange the secret with server 115 for the secure session. In subsequent steps, the security gateway 120 exchanges secure data packets with the server 115 over the secure session, as illustrated earlier in this document.

Figure 9:
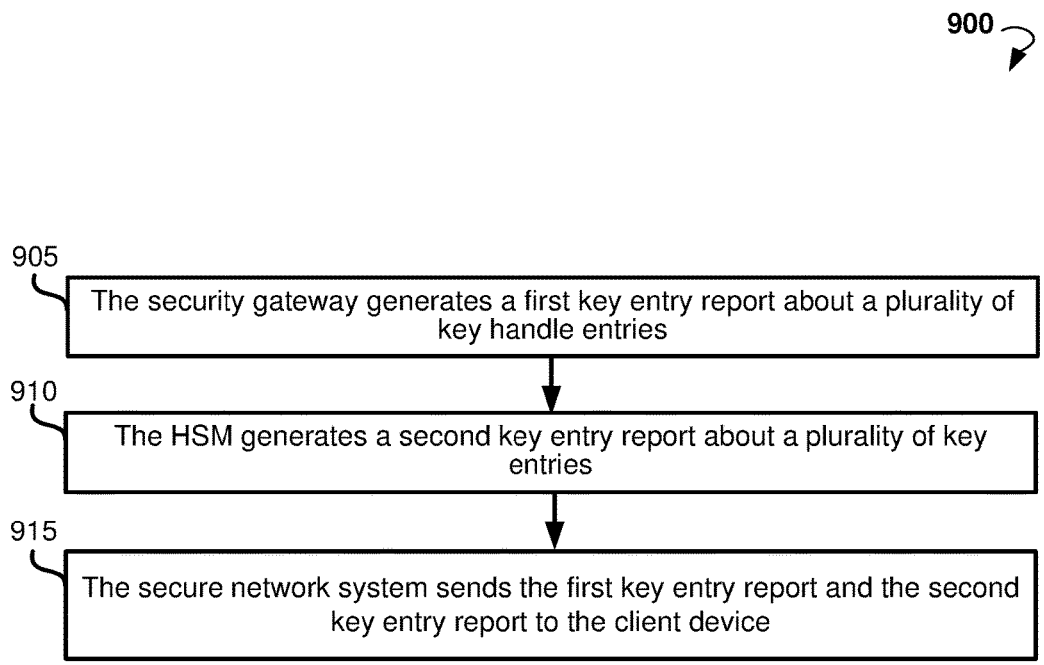
FIG. 9 is a flow diagram showing operations of a method for reporting on usage of key handles.

FIG. 9 is a flow diagram showing operations of a method 900 for reporting on usage of key handles, according to an example embodiment. In some embodiments, the steps of method 900 may be combined, performed in parallel, or performed in a different order. The method 900 may also include additional or fewer steps than those illustrated. The method 900 can be implemented with one or more modules or devices shown in FIG. 1 and described above.

The method 900 commences with step 905, when the security gateway 120 generates a first key entry report about a plurality of key handle entries. In some embodiments, the first key entry report includes the public key of the key handle entry or the security certificate of the key handle entry. In other embodiments, the first key entry report includes the public key of the key handle entry and the security certificate of the key handle entry. In yet more embodiments, the first key entry report includes one or more key handle entries associated to one or more active secure sessions processed by the security gateway 120. In addition, the first key entry report can include one or more key handle entries associated to one or more disconnected secure sessions processed by the security gateway 120.

In step 910, the HSM 125 generates a second key entry report about a plurality of key entries. In one embodiment, the second key entry report includes the key handle of the key entry and the public key of the key entry. In one embodiment, the second key entry report also includes one or more deleted key entries. In yet additional embodiment, the second key entry report includes one or more active key entries.

In step 915, the secure network system 105 sends the first key entry report and the second key entry report to the client device 110, such as a network security console computer or a network management system. In one embodiment, the secure network system 105 displays the first key entry report or the second key entry report on a connected display upon a user instruction. Moreover, the secure network system 105 can store the generated first and second key entry reports in a memory (e.g., storage 121). In certain embodiments, the secure network system 105 generates the first key entry report and the second key entry report from time to time, periodically, or according to a user instruction, or a request from a network computer.

In the above-described embodiments, the HSM 125 performs the processes of storing the public key in the key entry, generating the secret including the pre-master key and master key, and encrypting/decrypting data packets for the secure session. This needs not be the case when the secure network system 105 includes a plurality of HSMs 125 such as HSM 125A and HSM 125B. In this embodiment, the HSM 125A and HSM 125B can share the processing among themselves. In one embodiment, the HSM 125A handles storing of the key entry and the public key, and generation of the secret, including generation of the pre-master key and the master secret key. The HSM 125B, however, can process the generation of the session and associate the session to the master key generated by the HSM 125A. Moreover, the HSM 125A can encrypt the data packets using the master key when requested by the security gateway 120 for sending to the secure session, and decrypt the data packets received from the secure session with the server 115 when requested by the security gateway 120. Thus, the processing configuration of this embodiment allows the secure network system 105 to process a plurality of secure sessions using the HSM 125A to handle secret generation and using the HSM 125B for encryption/decryption. In additional embodiments, the secure network system 105 includes additional HSMs configured for encryption/decryption when there are many data packets are involved. Moreover, the secure network system 105 includes additional HSMs configured for secret generation, when there is a need to handle a significant amount of secret generation.

Thus, methods and systems for providing secure data communication session have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

Figure 10:
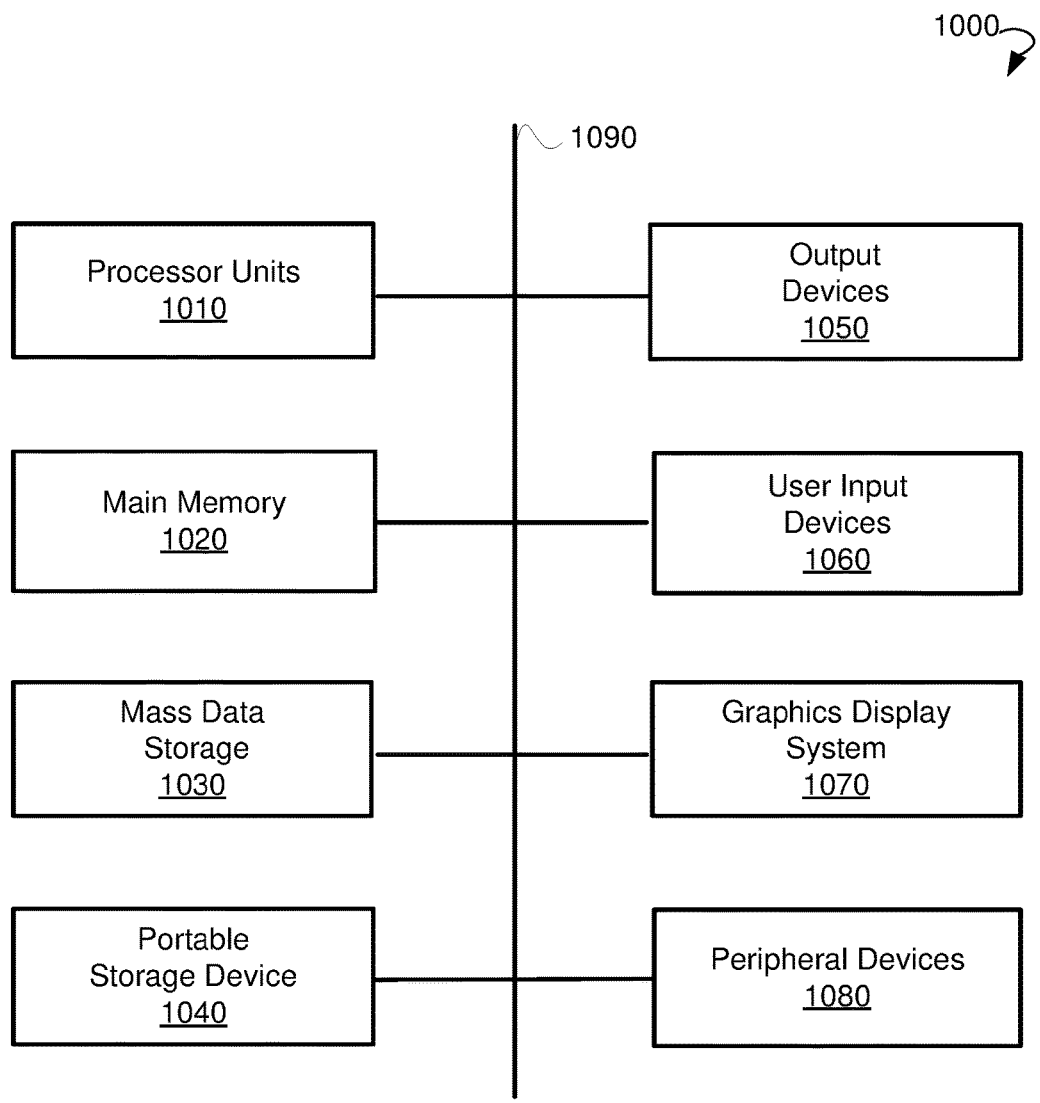
FIG. 10 is a diagrammatic representation of a computing device for a machine, within which a set of instructions for causing the machine to perform any one or more of the methodologies discussed herein can be executed.

FIG. 10 illustrates a computer system 1000 that may be used to implement embodiments of the present disclosure, according to an example embodiment. The computer system 1000 may serve as a computing device for a machine, within which a set of instructions for causing the machine to perform any one or more of the methodologies discussed herein can be executed. The computer system 1000 can be implemented in the contexts of the likes of computing systems, networks, servers, or combinations thereof. The computer system 1000 includes one or more processor units 1010 and main memory 1020. Main memory 1020 stores, in part, instructions and data for execution by processor units 1010. Main memory 1020 stores the executable code when in operation. The computer system 1000 further includes a mass data storage 1030, a portable storage device 940, output devices 1050, user input devices 1060, a graphics display system 1070, and peripheral devices 1080. The methods may be implemented in software that is cloud-based.

The components shown in FIG. 10 are depicted as being connected via a single bus 1090. The components may be connected through one or more data transport means. Processor units 1010 and main memory 1020 are connected via a local microprocessor bus, and mass data storage 1030, peripheral devices 1080, the portable storage device 1040, and graphics display system 1070 are connected via one or more (input/output) I/O buses.

Mass data storage 1030, which can be implemented with a magnetic disk drive, solid state drive, or an optical disk drive, is a non-volatile storage device for storing data and instructions for use by processor units 1010. Mass data storage 1030 stores the system software for implementing embodiments of the present disclosure for purposes of loading that software into main memory 920.

The portable storage device 1040 operates in conjunction with a portable non-volatile storage medium, such as a floppy disk, a compact disk, a Digital Versatile Disc (DVD), or USB storage device, to input and output data and code to and from the computer system 1000. The system software for implementing embodiments of the present disclosure is stored on such a portable medium and input to the computer system 1000 via the portable storage device 940.

User input devices 1060 provide a portion of a user interface. User input devices 1060 include one or more microphones; an alphanumeric keypad, such as a keyboard, for inputting alphanumeric and other information; or a pointing device, such as a mouse, a trackball, stylus, or cursor direction keys. User input devices 1060 can also include a touchscreen. Additionally, the computer system 1000 includes output devices 1050. Suitable output devices include speakers, printers, network interfaces, and monitors.

Graphics display system 1070 includes a liquid crystal display or other suitable display device. Graphics display system 1070 receives textual and graphical information and processes the information for output to the display device. Peripheral devices 1080 may include any type of computer support device to add additional functionality to the computer system.

The components provided in the computer system 1000 of FIG. 10 are those typically found in computer systems that may be suitable for use with embodiments of the present disclosure and are intended to represent a broad category of such computer components that are well known in the art. Thus, the computer system 1000 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 1000 may be implemented as a cloud-based computing environment, such as a virtual machine operating within a computing cloud. In other embodiments, the computer system 1000 may itself include a cloud-based computing environment, where the functionalities of the computer system 1000 are executed in a distributed fashion. Thus, the computer system 1000, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that include a plurality of computing devices, such as the computer system 1000, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for providing a secure data communication session have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A security network system for providing secure data communication, the system comprising:
    a security gateway operable to:
        establish a client session between the security gateway and a client device, wherein the client session is an unencrypted session;
        receive client session information from the client session, wherein the client session information includes an identification of a server with which the client device needs to exchange data; and
    a hardware security module (HSM) being a stand-alone hardware device in communication with the security gateway, wherein the HSM is operable to:
        store a public key received by the security gateway from the server based on the identification of the server;
        upon the storing of the public key, create a secret for encryption and decryption;
        encrypt the secret using the public key of the server; and
        provide the secret encrypted by the HSM to the security gateway;
    wherein the security gateway is further configured to establish a secure session between the security gateway and the server based on client session data, the secure session being encrypted by the security gateway using the secret, wherein the client device communicates with the server via the client session between the security gateway and the client device and the secure session between the security gateway and the server, wherein the server decrypts the secure session using the public key of the server.

2. The system of claim 1, wherein the security gateway is further operable to:
    send a first request to the server, wherein the first request includes at least a part of the client session information;
    in response to the first request, receive a security certificate and the public key from the server; and
    determine that the security certificate obtained from the server is a valid security certificate.

3. The system of claim 2, wherein the security gateway is further operable to send a second request to the HSM, wherein the second request includes the public key obtained from the server; and
    wherein the HSM is further operable to generate a key entry in a storage of the HSM in response to the receipt of the second request, wherein the key entry includes the public key obtained from the server.

4. The system of claim 3, wherein the HSM is further operable to generate a key handle associated with the public key, wherein the key handle is configured to uniquely identify the public key; and
    wherein the key entry further includes the key handle.

5. The system of claim 4, wherein the security gateway is further operable to:
    receive the key handle from the HSM;
    generate a key handle entry in a storage of the security gateway; and
    store the key handle received from the HSM in the key handle entry.

6. The system of claim 5, wherein the security gateway is further operable to send by the security gateway a third request to the HSM; and
    wherein the HSM is further operable to:
        generate, in response to the receipt of the third request, a context of the secure session between the security gateway and the server; and
        generate, in response to the receipt of the third request, the secret, wherein the secret includes at least one secret key for data encryption or decryption.

7. The system of claim 6, wherein the security gateway is further operable to send by the security gateway a fourth request to the HSM, wherein the fourth request includes the key handle from the storage of the security gateway; and
wherein the HSM is further operable to:
in response to the receipt of the fourth request, match the key handle from the storage of the security gateway with the key entry stored in the storage of the HSM;
based on a result of the matching, retrieve the public key from the key entry; and
based on the result of the matching, retrieve the secret.

8. The system of claim 7, wherein the HSM is further operable to:
generate a Secure Sockets Layer (SSL) message including the secret encrypted using the public key; and
send the SSL message to the security gateway.

9. The system of claim 8, wherein the security gateway is further operable to:
send the SSL message to the server, wherein the SSL message causes the server to decrypt the SSL message and retrieve the secret from the SSL message;
wherein the establishing of the secure session between the security gateway and the server enables the security gateway to exchange encrypted data packets with the server encrypted, wherein the encrypted data packets can be decrypted by the server by decrypting the secret using the public key.

10. A method for providing secure data communication through a security network system, the security network system including a security gateway and at least one Hardware Security Module (HSM), the HSM being a stand-alone hardware device in communication with the security gateway, the method comprising:
establishing, by the security gateway, a client session between the security gateway and a client device, wherein the client session is an unencrypted session;
receiving, by the security gateway, client session information from the client session, wherein the client session information includes an identification of a server with which the client device needs to exchange data;
storing, by the HSM, a public key received by the security gateway from the server based on the identification of the server;
upon the storing of the public key, creating, by the HSM, a secret for encryption and decryption;
encrypting, by the HSM, the secret using the public key of the server;
providing, by the HSM, the secret encrypted by the HSM to the security gateway; and
establishing, by the security gateway, a secure session between the security gateway and the server based on client session data, the secure session being encrypted by the security gateway using the secret, wherein the client device communicates with the server via the client session between the security gateway and the client device and the secure session between the security gateway and the server, wherein the server decrypts the secure session using the public key of the server.

11. The method of claim 10, wherein the establishing of the secure session comprises:
sending by the security gateway a first request to the server, wherein the first request includes at least a part of the client session information; and
in response to the first request, receiving by the security gateway a security certificate and the public key from the server.

12. The method of claim 11, further comprising determining by the security gateway that the security certificate obtained from the server is a valid security certificate.

13. The method of claim 12, further comprising:
sending by the security gateway a second request to the HSM, wherein the second request includes the public key obtained from the server; and
in response to the receipt of the second request, generating by the HSM a key entry in a storage of the HSM, wherein the key entry includes the public key obtained from the server.

14. The method of claim 13, further comprising generating by the HSM a key handle associated with the public key, wherein the key handle is configured to uniquely identify the public key; and
wherein the key entry further includes the key handle.

15. The method of claim 14, further comprising:
receiving by the security gateway the key handle from the HSM;
generating by the security gateway a key handle entry in a storage of the security gateway; and
storing by the security gateway the key handle received from the HSM in the key handle entry.

16. The method of claim 15, further comprising:
sending by the security gateway a third request to the HSM;
in response to the receipt of the third request, generating by the HSM a context of the secure session between the security gateway and the server; and
in response to the receipt of the third request, generating by the HSM the secret, wherein the secret includes at least one secret key for data encryption or decryption.

17. The method of claim 16, further comprising:
sending by the security gateway a fourth request to the HSM, wherein the fourth request includes the key handle from the storage of the security gateway;
in response to the receipt of the fourth request, matching by the HSM the key handle from the storage of the security gateway with the key entry stored in the storage of the HSM;
based on a result of the matching, retrieving by the HSM the public key from the key entry; and
based on the result of the matching, retrieving the secret by the HSM.

18. The method of claim 17, further comprising:
generating by the HSM a SSL message including the secret encrypted using the public key; and
sending the SSL message by the HSM to the security gateway.

19. The method of claim 18, further comprising:
sending by the security gateway the SSL message to the server, wherein the SSL message causes the server to decrypt the SSL message and retrieve the secret from the SSL message; and
wherein the establishing, by the security gateway and the server, of the secure session between the security gateway and the server enables the security gateway to exchange encrypted data packets with the server, wherein the encrypted data packets can be decrypted by the server by decrypting the secret using the public key.

20. A non-transitory processor-readable medium having instructions stored thereon, which when executed by one or more processors, cause the one or more processors to implement a method for providing secure data communication through a security network system, the security network system including a security gateway and at least one Hardware Security Module (HSM), the HSM being a stand-alone hardware device in communication with the security gateway, the method comprising:

establishing, by the security gateway, a client session between the security gateway and a client device, wherein the client session is an unencrypted session;

receiving, by the security gateway, client session information from the client session, wherein the client session information includes an identification of a server with which the client device needs to exchange data;

storing, by the HSM, a public key received by the security gateway from the server based on the identification of the server;

upon the storing of the public key, creating, by the HSM, a secret for encryption and decryption;

encrypting, by the HSM, the secret using the public key of the server;

providing, by the HSM, the secret encrypted by the HSM to the security gateway; and establishing, by the security gateway, a secure session between the security gateway and the server based on the client session data, the secure session being encrypted by the security gateway using the secret, wherein the client device communicates with the server via the client session between the security gateway and the client device and the secure session between the security gateway and the server, wherein the server decrypts the secure session using the public key of the server.

* * * * *